United States Patent Office

3,591,592
Patented July 6, 1971

3,591,592
SYNTHESIS OF DISUBSTITUTED PYRIDINES
Paul S. Anderson, North Wales, Pa., assignor to Merck & Co., Inc., Rahway, N.J.
No Drawing. Filed Mar. 29, 1968, Ser. No. 717,407
Int. Cl. C07d 31/20
U.S. Cl. 260—290       3 Claims

ABSTRACT OF THE DISCLOSURE

By introducing an alkyl or aryl group into the 2-position of a 4-alkyl or 4-aryl pyridine with an alkyl or aryl lithium reagent 2,4-alkyl and aryl pyridine compounds can be conveniently prepared.

SUMMARY OF THE INVENTION

This invention relates to alkyl and aryl pyridine compounds and processes of alkylation and arylation for preparing them. The compounds included in this invention have proved to be effective starting materials for the synthesis of a number of important compounds as well as being commercially useful because of their basic properties.

BACKGROUND OF THE INVENTION

Much difficulty has been encountered in the availability of 2,4-disubstituted pyridines. The costs resulting from their unavailability has limited their uses in organic chemistry.

Previous methods of preparing 2,4-disubstituted pyridines are generally reviewed in The Chemistry of Heterocyclic Compounds, Pyridine and Its Derivatives, Part Two, Chap. V, Alkylpyridine and Arylpyridines by Leon E. Tenenbaum, p. 155 forward (Interscience, 1961). Besides the conventional methods described, it is well known from the art how to introduce alkyl or aryl substituents at the 2-position of a pyridine molecule by reacting the pyridine with alkyl or aryl lithium compounds. It is further well known from the art how to introduce alkyl or aryl substituents at the 2-position of a 3-alkyl pyridine compound by reacting the 3-alkyl pyridine with an alkyl or aryl lithium compound. The reasons given for the reaction taking place at the 2-position is that the hydrogens on the 3-alkyl group are not acidic enough to react with the lithium reagent.

It is further well known from the art, however, that a 4-alkyl pyridine upon reacting with an alkyl or aryl lithium reagent in ether forms a lithium derivative of the 4-alkyl pyridine as reported by Carl Osuch and Robert Levine, Journal of Organic Chemistry, volume 22, p. 939 (1957).

There are usually many side reactions resulting when conventional methods are employed and the above reactions are carried out in an ether solvent [Henry Gilman and H. Smith Broadbent, J.A.C.S.: 70, p. 2809 (1948)]. This is due primarily because of the unpredictability of the complicated synthetic methods involved. The resulting side reactions increase the possibility of isomers present and decrease yields of desired product, for isomers are most often very difficult to separate without extraordinary techniques. The unavailability of high quality reagents on a commercial scale and lack of sophistication in technique of handling reactive metallic organic reagents has been a drawback until recently. It is apparent that because of the variety of difficulties that are present, synthesis of 2,4-disubstituted pyridines has been not only time consuming but economically unfeasible.

DESCRIPTION AND PREFERRED EMBODIMENTS

This invention more particularly relates to a method for preparing 2,4-disubstituted pyridines having the formula structure:

I
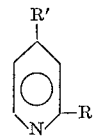

wherein

R is alkyl (preferably lower alkyl such as methyl, ethyl, propyl, i-propyl, butyl, s-butyl, i-butyl, t-butyl, etc., provided it is capable of forming an alkyl lithium reagent);
aryl (preferably phenyl or a substituted phenyl that is capable of forming an aryl lithium reagent) or aralkyl (preferably arlower alkyl such as benzyl, phenethyl, etc.);

R′ is alkyl (preferably lower alkyl such as methyl, ethyl, propyl, i-propyl, butyl, s-butyl, i-butyl, t-butyl, etc.);
aryl (preferably phenyl) or
substituted aryl (preferably substituted phenyl such as alkoxyphenyl (preferably lower alkoxyphenyl such as methoxyphenyl, etc.) or alkylphenyl (preferably lower alkylphenyl such as tolyl, xylyl, etc.), etc., provided the substituent will not react with the lithium reagent).

It further relates more particularly to a method for preparing 2,4-disubstituted pyridines that is both economical and noncomplicated. This invention still further relates to a method for obtaining 2,4-disubstituted pyridines in a high percentage yield from readily available starting materials. It again also relates to a synthesis of 2,4-disubstituted pyridines which does not result in complex mixtures of isomeric products that are difficult to separate by ordinary means. What the present invention further relates to will become apparent to those skilled in the art by reading the specification.

The more preferred aspect of this invention relates to a method of synthesizing 2,4-diloweralkyl, 2-loweralkyl-4-phenyl, 2-phenyl-4-loweralkyl-2,4-diphenyl, 2-arlower-alkyl-4-loweralkyl and 2-arloweralkyl-4-phenylpyridines.

As a result of the unavailability of 2,4-disubstituted pyridines and the costs resulting from their complicated isolation or synthesis, processes for the preparation of compounds which would incorporate 2,4-disubstituted pyridines as intermediates have been restricted. The ability to conveniently and economically synthesize 2,4-disubstituted pyridines of this invention also provides the utility for their use. They can now be economically employed as starting materials from which a number of important medicinal compounds can be synthesized in the antitubercular (Der. 25, 968) field. They further provide improved and economically feasible methods of preparing compounds used in herbicidal manufacture (Der. 9768), fumigants (C.A. 42:7912g) and copolymers (U.S. 2,826,569). They are stronger bases than pyridine and as a result they have many uses in commercial industry as salts for both organic and inorganic acids and for biologically active acids. They are also useful as solvents for reaction systems requiring a basic medium but requiring a solvent with a higher temperature than pyridine. They can be used as azeotropes and for chemical purification and separations.

I have found that an alkyl, aryl or aralkyl radical can be introduced into the 2-position of a 4-alkyl or 4-aryl pyridine. This can be accomplished by reacting the 4-alkyl or 4-aryl pyridine starting material with an alkyl, aryl or aralkyl lithium reagent under certain reaction conditions. Although any 4-alkyl or 4-aryl pyridine can be used as a starting material in this invention, it is preferable to use a 4-lower alkyl pyridine such as 4-methyl, 4-ethyl, 4-propyl, 4-i-propyl, 4-butyl, 4-s-butyl, 4-i-butyl, 4-t-butyl, etc. pyridine or 4-phenyl or 4-substituted phenyl pyridine. The 4-substituted pyridines used should not have substituents that will react themselves with the lithium reagent, such as halophenyl. The preferable alkyl, aryl or aralkyl lithium reagents used are alkyl, aryl or aralkyl lithium reagents wherein the alkyl group is a lower alkyl such as methyl lithium reagent, ethyl lithium reagent, propyl lithium reagent, i-propyl lithium reagent, butyl lithium reagent, i-butyl lithium reagent, s-butyl lithium reagent, t-butyl lithium reagent, etc. The preferable aryl group is phenyl such as phenyl lithium reagent or any substituted phenyl group that is capable of forming a phenyl lithium reagent that will react in this process as does the phenyl lithium reagent (preferably p-methoxyphenyl lithium reagent, etc.). The preferable aralkyl group is arloweralkyl such as benzyl lithium reagent or phenethyl lithium reagent.

The various starting materials of this invention including the lithium reagents and the 4-substituted pyridines are known throughout the literature and many are commercially available.

In order to obtain the desired products of this invention, it has been found that the 4-alkyl or 4-aryl pyridine must be added to a solution of the lithium reagent. The addition of the 4-alkyl or 4-aryl pyridine to the lithium reagent solution should be performed at a slow rate and preferably dropwise. The reagents should not be mixed together simultaneously. At an increased addition speed the desired products will not be produced. Once the 4-alkyl or 4-aryl pyridine is added to the lithium reagent, the mixture should be heated to a temperature of about 70°–100° C. for a period of time that is sufficient to complete the reaction. This time may vary from 5–10 hours. The reaction is usually run at a temperature which is the reflux temperature of the particular hydrocarbon solvent in which the lithium reagent is dissolved. In order to obtain the maximum yields of the desired product, however, it is preferable that the reaction between the 4-alkyl or 4-aryl pyridine and the lithium reagent be carried out at about 80° C. for at least 5 hours.

The lithium reagents used as starting materials in this invention are usually sold commercially and are dissolved in an inert hydrocarbon solvent (such as benzene, toluene, hexane, pentane, petroleum ether, and the like). If the lithium reagent is prepared it is prepared in an ether solvent and then the ether is replaced with a hydrocarbon solvent and should preferably be done so before the 4-alkyl or 4-aryl pyridine is added to it. The use of a hydrocarbon solvent is a preferred aspect of this invention. Solvents which promote alkylation at the 4-position, particularly ether solvents (such as ethyl ether) and the like should be avoided.

The 4-alkyl and 4-aryl pyridines used in this invention are usually liquids and thus can be added dropwise to the lithium reagent solution. It is preferable to dissolve the 4-alkyl or 4-aryl pyridine in an inert hydrocarbon solvent (such as benzene, toluene, hexane, pentane, petroleum ether, and the like). Usually the same type solvent is used as that inert solvent in which the lithium reagent is dissolved to render it inactive. This is not absolutely necessary, however. The solvents used should be free from moisture and this can be accomplished by use of suitable drying agents such as molecular sieves. It is preferable that the reaction be carried out in a dry, inert atmosphere.

It has further been found that in order to insure properly substituted end products in high yields there should be a 1:1 molar ratio of the 4-alkyl or 4-aryl pyridine and the alkyl or aryl lithium reagent. If a 1:1 molar ratio of the starting materials is not used, there may be additional substitution at the 6-position of the pyridine compound.

The desired 2,4-disubstituted pyridines of the present invention can be isolated from the reaction mixture by methods well known in the art. One preferable method for example is the hydrolysis of the reaction mixture in an ice-water mixture followed by extraction of the products from this mixture with an inert organic solvent (such as diethyl ether) and the concentration of the organic solvent to dryness. A salt can then be isolated from the residue which can then be recrystallized to effect purity or the product can be purified from the residue by fractional distillation.

The following are detailed examples of the processes of this invention. They are to be considered as illustrations of the invention and are not limitations thereof.

EXAMPLE 1

2-ethyl-4-methyl-pyridine

To a stirred solution of 1 mole of ethyl lithium in 500 ml. of benzene is added dropwise with stirring 1 mole (93 grams) of 4-methylpyridine. After the addition is complete, the reaction mixture is heated under reflux for eight hours, cooled and poured onto ice. The reaction mixture is stirred and then the organic layer is separated and extracted with aqueous hydrochloric acid (25%). The acid extracts are combined, made basic with concentrated aqueous ammonia and extracted with ether. The combined ether extracts are dried over magnesium sulfate, filtered and evaporated to yield a liquid which is then distilled and on redistillation gives 77 g. of 2-ethyl-4-methylpyridine, B.P. 107–108°/85 mm.

EXAMPLE 2

When the procedure of Example 1 is followed but substituting the reagents listed in Table I below for the reagents of Example 1, there is obtained the corresponding 2,4-disubstituted pyridines.

TABLE I

| Starting pyridine | Lithium reagent | Solvent | Product |
|---|---|---|---|
| 4-methylpyridine | n-Propyl lithium | 5:1 toluene/ether | 4-methyl-2-propylpyridine. |
| Do | i-Propyl lithium | Pentane [1] | 4-methyl-2-i-propyl pyridine. |
| 4-ethylpyridine | n-Propyl lithium | 5:1 toluene/ether | 4-ethyl-2-propylpyridine. |
| 4-propylpyridine | do | do | 2,4-dipropylpyridine. |
| 4-methylpyridine | n-Butyl lithium | Hexane | 4-methyl-2-butylpyridine. |
| Do | Sec-butyl lithium | Heptane | 4-methyl-2-sec-butylpyridine. |
| Do | t-Butyl lithium | 1:1 toluene/benzene | 4-methyl-2-t-butylpyridine. |
| Do | Phenyl lithium | 7:3 benzene/ether | 4-methyl-2-phenylpyridine. |
| 4-ethylpyridine | do | do | 4-ethyl-2-phenylpyridine. |
| 4-methylpyridine | Phenethyl lithium | Benzene | 4-methyl-2-phenethylpyridine. |
| 4-phenylpyridine | Ethyl lithium | do | 4-phenyl-2-ethylpyridine. |
| Do | n-Propyl lithium | 5:1 toluene/ether | 4-phenyl-2-propylpyridine. |
| Do | Phenyl lithium | 7:3 benzene/ether | 2,4-diphenylpyridine. |
| Do | Benzyl lithium | Benzene | 4-phenyl-2-benzylpyridine. |
| p-Methoxyphenyl-pyridine | Ethyl lithium | do | 4-(p-methoxyphenyl)-2-ethylpyridine. |

[1] The pentane is removed and replaced with the higher boiling mixture of 1:1 toluene-benzene after addition of the 4-methylpyridine.

I claim:
1. A process for the preparation of 2,4-disubstituted pyridine of the formula:

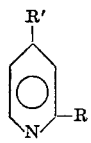

wherein R is lower alkyl, phenyl or phenethyl and R' is lower alkyl, phenyl or substituted phenyl wherein the substituent is lower alkyl or lower alkoxy which comprises adding a 4-substituted pyridine of the formula:

wherein R' is as described above, dropwise to an organo lithium reagent of the formula R—Li wherein R is as described above in an inert hydrocarbon solvent selected from the group consisting of benzene, toluene, hexane, pentane and petroleum ether at a temperature of 70° C.–100° C. wherein the 4-substituted pyridine and the organo lithium reagent are in a 1:1 mole ratio.

2. A process according to claim 1 wherein R and R' are both lower alkyl.

3. A process according to claim 1 wherein R is ethyl and R' is methyl.

References Cited

Osuch, J. Org. Chem., vol. 22, pp. 639–943 (1957).

JOHN D. RANDOLPH, Primary Examiner

H. I. MOATZ, Assistant Examiner

U.S. Cl. X.R.

260—297R